(12) United States Patent
Robinson et al.

(10) Patent No.: US 6,210,328 B1
(45) Date of Patent: Apr. 3, 2001

(54) ULTRASONIC DIAGNOSTIC IMAGING SYSTEM WITH VARIABLE SPATIAL COMPOUNDING

(75) Inventors: Andrew L. Robinson; Robert R. Entrekin, both of Kirkland; James R. Jago, Seattle, all of WA (US)

(73) Assignee: ATL Ultrasound, Bothell, WA (US)

( * ) Notice: Subject to any disclaimer, the term of this patent is extended or adjusted under 35 U.S.C. 154(b) by 0 days.

(21) Appl. No.: 09/335,058

(22) Filed: Jun. 17, 1999

Related U.S. Application Data

(60) Provisional application No. 60/102,923, filed on Oct. 1, 1998.

(51) Int. Cl.[7] ............................................ A61B 8/00
(52) U.S. Cl. .................................... 600/437; 600/443
(58) Field of Search .................................. 600/437, 443, 600/444, 447, 454–456; 73/625–626

(56) References Cited

U.S. PATENT DOCUMENTS

| | | |
|---|---|---|
| 4,070,905 | 1/1978 | Kossoff . |
| 4,159,462 | 6/1979 | Rocha et al. . |
| 4,649,327 * | 3/1987 | Fehr et al. ............................ 600/443 |
| 4,649,927 | 3/1987 | Fehr et al. . |
| 4,751,846 * | 6/1988 | Dousse ................................ 600/437 |
| 5,538,004 * | 7/1996 | Bamber ............................... 600/443 |
| 5,566,674 | 10/1996 | Weng . |
| 5,623,928 | 4/1997 | Finger et al. . |
| 5,655,535 | 8/1997 | Teo et al. . |
| 5,779,641 | 7/1998 | Hatfield et al. . |
| 5,782,766 * | 7/1998 | Weng et al. ........................ 600/443 |
| 5,885,218 * | 3/1999 | Teo et al. ........................... 600/443 |
| 5,908,390 | 6/1999 | Matsushima . |

OTHER PUBLICATIONS

Feigenbaum, Echocardiography, Lea & Febiger, 1976 at pp 32–34, Philadelphia, PA.
Carpenter et al., Technical Note—A Multimode Real Time Scanner, Ultrsound in Med. & Biol., vol. 6, pp 279–284, Pergamon Press Ltd. 1980, Great Britain.
Berson et al., Compound Scanning With a Electrically Steered Beam, Ultrasonic Imaging 3, pp 303–308, Academic Press, Inc. 1981.
Shattuck et al., Compound Scanning With a Phased Array, Ultrasonic Imaging 4, pp 93–107, Academic Press, Inc. 1982.
Jesperson et al., Multi–Angle Compound Imaging, Ultrasonic Imaging 20, pp 81–102, Dynamedia, Inc. 1998.
McCann et al., "Multidimensional Ultrasonic Imaging for Cardiology," Proceedings of the IEEE, U.S., IEEE. New York, vol. 76, No. 9, Sep. 1988 (1988–09) pp 1063 –1072.

* cited by examiner

Primary Examiner—Marvin M. Lateef
Assistant Examiner—Maulin Patel
(74) Attorney, Agent, or Firm—W. Brinton Yorks, Jr.

(57) ABSTRACT

An ultrasonic diagnostic imaging system and method are described in which the number of acquired ultrasonic images which are compounded to form a spatially compounded image is variable. The number of acquired images which is compounded is varied in response to changes in system operating parameters initiated directly or indirectly by the system user.

34 Claims, 3 Drawing Sheets

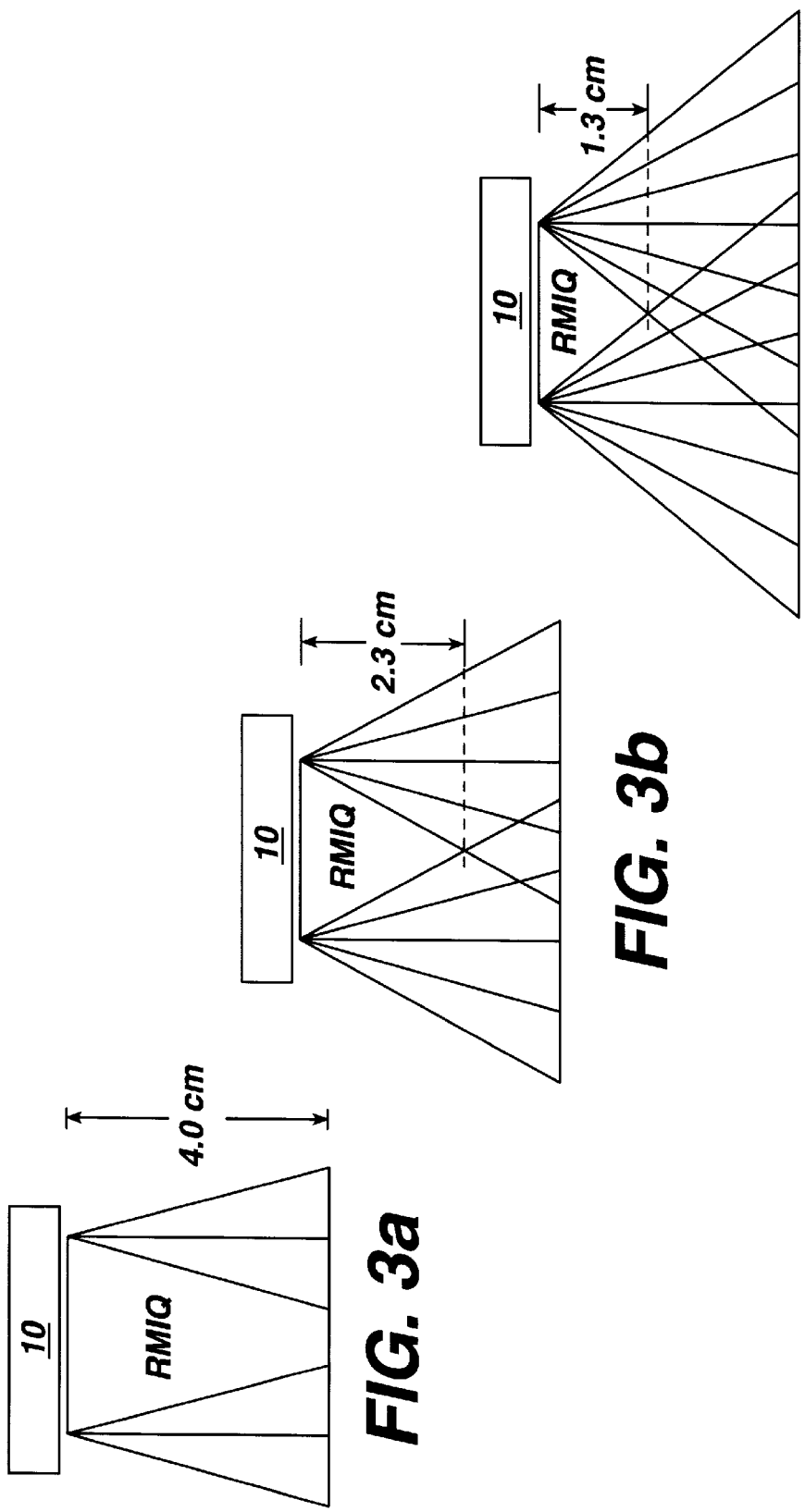

ULTRASONIC DIAGNOSTIC IMAGING SYSTEM WITH VARIABLE SPATIAL COMPOUNDING

This application claims the benefit of Provisional U.S. Patent Application serial No. 60/102,923, filed Oct. 1, 1998.

This invention relates to ultrasonic diagnostic imaging systems and, in particular, to ultrasonic diagnostic imaging systems which produce spatially compounded images by combining a variable number of received images.

Spatial compounding is an imaging technique in which a number of ultrasound images of a given target that have been obtained from multiple vantage points or angles (look directions) are combined into a single compounded image by combining the data received from each point in the compound image target which has been received from each angle. Examples of spatial compounding may be found in U.S. Pat. Nos. 4,649,927; 4,319,489; and 4,159,462. Real time spatial compound imaging is performed by rapidly acquiring a series of partially overlapping component image frames from substantially independent spatial directions, utilizing an array transducer to implement electronic beam steering and/or electronic translation of the component frames. The component frames are combined into a compound image by summation, averaging, peak detection, or other combinational means. The acquisition sequence and formation of compound images are repeated continuously at a rate limited by the acquisition frame rate, that is, the time required to acquire the full complement of scanlines over the selected width and depth of imaging.

The compounded image typically shows lower speckle and better specular reflector delineation than conventional ultrasound images from a single viewpoint. Speckle is reduced (i.e. speckle signal to noise ratio is improved) by the square root of N in a compound image with N component frames, provided that the component frames used to create the compound image are substantially independent and are averaged. Several criteria can be used to determine the degree of independence of the component frames (see, e.g., O'Donnell et al. in IEEE Trans. UFFC v.35, no.4, pp 470–76 (1988)). In practice, for spatial compound imaging with a steered linear array, this implies a minimum steering angle between component frames. This minimum angle is typically on the order of several degrees.

The second way that spatial compound scanning improves image quality is by improving the acquisition of specular interfaces. For example, a curved bone-soft tissue interface produces a strong echo when the ultrasound beam is exactly perpendicular to the interface, and a very weak echo when the beam is only a few degrees off perpendicular. These interfaces are often curved, and with conventional scanning only a small portion of the interface is visible. Spatial compound scanning acquires views of the interface from many different angles, making the curved interface visible and continuous over a larger field of view. Greater angular diversity generally improves the continuity of specular targets. However, the angular diversity available is limited by the acceptance angle of the transducer array elements. The acceptance angle depends on the transducer array element pitch, frequency, and construction methods.

One of the problems associated with real time spatial compound imaging is that several image acquisitions are needed to produce each new compound image frame. The time needed to acquire a spatial compound image consisting of N component frames is approximately N times longer than that of each individual component frame. It is generally desirable to acquire a large number of component frames to maximize the image quality of the compound image. However, it is also generally desirable to maintain high compound image frame rates of display to facilitate real time examination, leading to a tradeoff between compound image quality and compound image frame rate.

In accordance with the principles of the present invention, the number of different look directions of a target which are compounded is variable in accordance with changes in ultrasound system operating parameters, either singly or in combination, which improves the performance of the spatial compounding system. These parameters include image display depth, acquisition rate, number of scanlines or line density, number of transmit focal zones, amount of deadtime per pulse repetition interval (PRI), number of transmissions per image line, depth of region of greatest compounding, clinical application, number of simultaneous modes, size of region of interest, and mode of operation (e.g., survey or target mode). In accordance with a preferred embodiment of the present invention, the steering angle(s) of the look directions are varied in response to changes in the image depth. In a constructed embodiment an ultrasonic transducer scans a target from a number of different perspectives. For example, several sector images can be sequentially acquired by a phased array transducer, each with an apex located at a different point in relation to the array. As a second example a steered linear array can be used to image the target with a sequence of groups of beams, each group steered at a different angle with respect to the axis of the array. Thirdly, beams having no particular relationship to a frame or image format can interrogate targets in a region of the body from multiple directions, by the transmission of individual beams or multiple beams simultaneously. In either case the received images are processed in the usual way by beamforming and detection and stored in a memory. To form the compound image the component frames or target echoes to be combined are spatially aligned (if not already aligned by a common beam steering reference) by scan conversion or resampling. The common spatial locations in the image field are then compounded by averaging or summing and the resultant compound image is displayed.

In the drawings:

FIGS. 3a–3b illustrate the effects of increasing and decreasing the number of acquired frames which are compounded to form a spatially compounded ultrasonic image.

Figure 1:
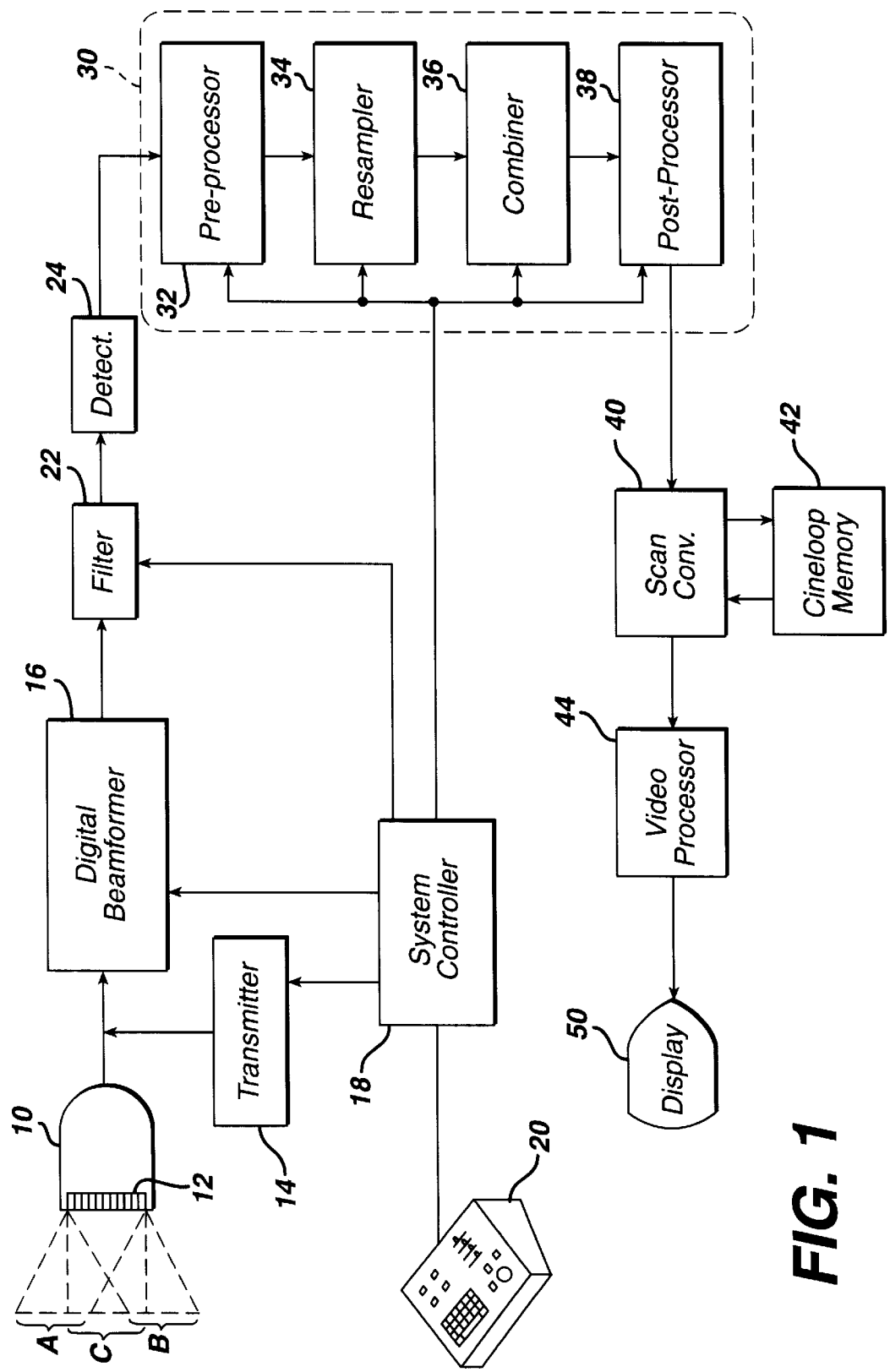
FIG. 1 illustrates in block diagram form an ultrasonic diagnostic imaging system constructed in accordance with the principles of the present invention.

Referring first to FIG. 1, an ultrasonic diagnostic imaging system constructed in accordance with the principles of the present invention is shown. A scanhead 10 including an array transducer 12 transmits beams at different angles over an image field denoted by the dashed rectangle and parallelograms. Three groups of scanlines are indicated in the drawing, labeled A, B, and C with each group being steered at a different angle relative to the scanhead. The transmission of the beams is controlled by a transmitter 14 which controls the phasing and time of actuation of each of the elements of the array transducer so as to transmit each beam from a predetermined origin along the array and at a predetermined angle. The echoes returned from along each scanline are received by the elements of the array, digitized as by analog to digital conversion, and coupled to a digital beamformer 16. The digital beamformer delays and sums the echoes from the array elements to form a sequence of focused, coherent digital echo samples along each scanline. The transmitter 14 and beamformer 16 are operated under control of a system controller 18, which in turn is responsive to the settings of controls on a user interface 20 operated by the user of the ultrasound system. The system controller controls the transmitter to transmit the desired number of scanline groups at the desired angles, transmit energies and frequencies. The system controller also controls the digital beamformer to properly delay and combine the received echo signals for the apertures and image depths used.

The scanline echo signals are filtered by a programmable digital filter 22, which defines the band of frequencies of interest. When imaging harmonic contrast agents or performing tissue harmonic imaging the passband of the filter 22 is set to pass harmonics of the transmit band. The filtered signals are then detected by a detector 24. In a preferred embodiment the filter and detector include multiple filters and detectors so that the received signals may be separated into multiple passbands, individually detected and recombined to reduce image speckle by frequency compounding. For B mode imaging the detector 24 will perform amplitude detection of the echo signal envelope. For Doppler imaging ensembles of echoes are assembled for each point in the image and are Doppler processed to estimate the Doppler shift or Doppler power intensity.

In accordance with the principles of the present invention the digital echo signals are processed by spatial compounding in a processor 30. The digital echo signals are initially pre-processed by a preprocessor 32. The pre-processor 32 can preweight the signal samples if desired with a weighting factor. The samples can be preweighted with a weighting factor that is a function of the number of component frames used to form a particular compound image. The pre-processor can also weight edge lines that are at the edge of one overlapping image so as to smooth the transitions where the number of samples or images which are compounded changes. The pre-processed signal samples may then undergo a resampling in a resampler 34. The resampler 34 can spatially realign the estimates of one component frame to those of another component frame or to the pixels of the display space.

After resampling the image frames are compounded by a combiner 36. Combining may comprise summation, averaging, peak detection, or other combinational means. The samples being combined may also be weighted prior to combining in this step of the process. Finally, post-processing is performed by a post-processor 38. The post-processor normalizes the combined values to a display range of values. Post-processing can be most easily implemented by look-up tables and can simultaneously perform compression and mapping of the range of compounded values to a range of values suitable for display of the compounded image.

The compounding process may be performed in estimate data space or in display pixel space. In a preferred embodiment scan conversion is done following the compounding process by a scan converter 40. The compound images may be stored in a Cineloop memory 42 in either estimate or display pixel form. If stored in estimate form the images may be scan converted when replayed from the Cineloop memory for display. The scan converter and Cineloop memory may also be used to render three dimensional presentations of the spatially compounded images as described in U.S. Pat. Nos. 5,485,842 and 5,860,924, or displays of an extended field of view by overlaying successively acquired, partially overlapping images in the lateral dimension. Following scan conversion the spatially compounded images are processed for display by a video processor 44 and displayed on an image display 50.

Figure 2:
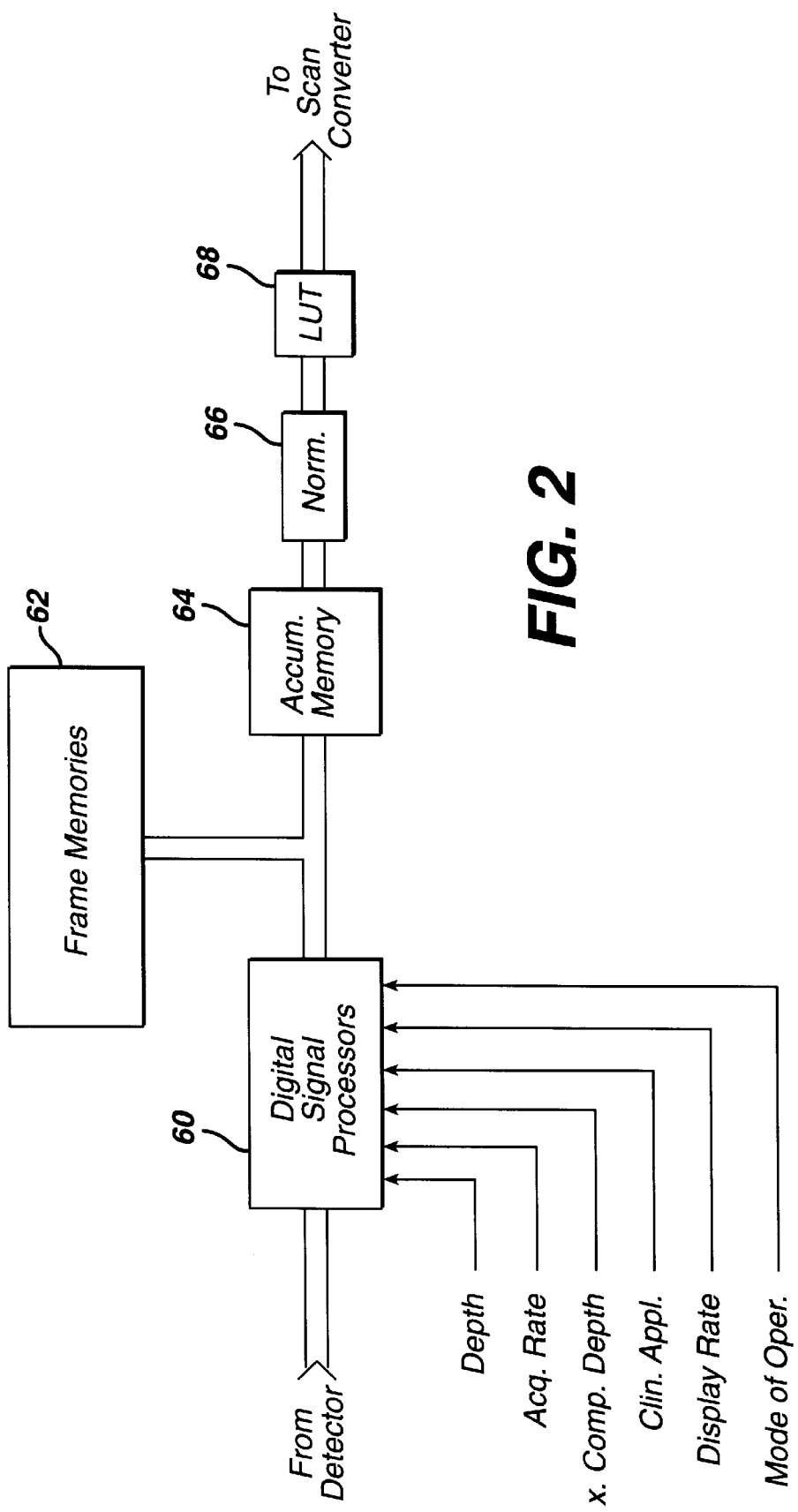
FIG. 2 illustrates in block diagram form a preferred implementation of the spatial compounding processor of FIG. 1.

FIG. 2 illustrates a preferred implementation of the spatial compounding processor 30 of FIG. 1. The processor 30 is preferably implemented by one or more digital signal processors 60 which process the image data in various ways. The digital signal processors 60 can weight the received image data and can resample the image data to spatially align pixels from frame to frame, for instance. The digital signal processors 60 direct the processed image frames to a plurality of frame memories 62 which buffer the individual image frames. The number of image frames capable of being stored by the frame memories 62 is preferably at least equal to the maximum number of image frames to be compounded such as sixteen frames. In accordance with the principles of the present invention, the digital signal processors are responsive to changes in system control parameters including image display depth, number of scanlines or line density, number of transmit focal zones, amount of deadtime per pulse repetition interval (PRI), number of transmissions per image line, depth of region of greatest compounding, clinical application, number of simultaneous modes, size of region of interest, mode of operation, and acquisition rate for determining the number of component frames to compound at a given point in time. The digital signal processors select component frames stored in the frame memories 62 for assembly as a compound image in accumulator memory 64. The compounded image formed in the accumulator memory 64 is weighted or mapped by a normalization circuit 66, then compressed to the desired number of display bits and, if desired, remapped by a lookup table (LUT) 68. The fully processed compounded image is then transmitted to the scan converter for formatting and display.

The digital signal processors 60 determine the number of frames which are to be compounded to improve image quality while still providing an acceptable realtime compound image frame rate. Increasing the number of component frames does not lead to a proportional or unlimited increase in the image quality of the compound image. There is, therefore, a practical maximum number of frames, each steered by a minimum angle, that can be usefully employed to improve image quality in spatial compound scanning. This number can vary widely depending on the transducer design and size of the active aperture, but can be as large as 16 component frames per compound image for an array with a large acceptance angle and small active apertures. The maximum useful number of frames will also depend on the mixture of speckle and anisotropic scatterers in the tissue of interest, and therefore on the clinical application.

The present invention has particular utility when the clinician is changing between "survey" and "target" modes of operation. During the survey mode of operation, the clinician is rapidly maneuvering the scanhead to quickly ascertain the presence of prominent physiological landmarks or features. The compounding of a large number of component frames when the scanhead is in motion will result in blurred images. Consequently the number component frames being compounded is reduced during the survey mode. As the clinical operator identifies potential abnormalities, the scanning motion is slowed down or stopped completely to image the features of interest ("targeted" or "study" mode). At this point, the image features within the component frames are more highly correlated, and motion blurring in the compound image is substantially reduced or completely eliminated as long as the scanhead is substantially stationary. During the target mode, the number of component frames being compounded is increased to produce high quality images without the consequence of blurring.

It is well known that the frame rate of an image with a given line density is dependent upon the maximum display depth of the image, because the speed of sound in tissue (~1.54 millimeters per microsecond) imposes a minimum round trip propagation delay of 13 microseconds for every centimeter of image depth. Typically, additional delay time is also added to prevent reverberation artifacts, that is the receipt of echoes at the beginning of one image line which are returning from deep depths of a previous image line. For an image consisting of 192 ray lines and a depth of 2 centimeters, the acquisition frame rate can be 100 frames per second or greater, but for an 8 centimeter image depth the frame rate can drop to 25 frames per second. While 25 frames per second is adequate for real time examination, a compound image frame rate for 7 component frames at this depth is less than 4 frames per second. A frame rate this slow would generally be considered inadequate for real time examination. Conversely, a compound image with 3 component frames with an image depth of 2 centimeters would have a compound frame rate of 33 frames per second, which is higher than necessary for real time examinations.

Compound scanning with a steered linear array results in a pattern of overlapping component frames such that the region of maximum image quality (RMIQ) where all N frames overlap is a trapezoidal or an inverted triangular region with its base at the top of the compound image. For a small number of component frames steered at the minimum angle, this region of maximum image quality extends deep into the compound image. For a large number of component frames, the RMIQ is relatively shallow. This is illustrated by FIGS. 3a–3c, which show three different compound scan geometries, each consisting of several partially overlapping steered linear component frames scanned from a linear array scanhead 10. For visual clarity, the minimum steering angle was chosen as 15° between component frames. FIG. 3a shows three component frames A, B, and C which are compounded, and the RMIQ extends the full 4.0 cm height of the image. FIG. 3b shows an image which compounds five component frames A, B, C, D and E, and the RMIQ now extends only 2.3 cm from the top of the compound frame. Similarly, FIG. 3c shows that for seven component frames A–G, the RMIQ of the compound image only extends 1.3 centimeters in depth. These drawings show that increasing the number of frames in the compound image decreases the size of the RMIQ. Thus, spatial compounding using component frames with large steering angles contributes very little additional image quality at depths deeper than the RMIQ.

It is apparent from the foregoing illustrations that that at shallow depths the frame rate is relatively high, which allows the use of more component frames (larger value of N) for spatial compound imaging while still maintaining an adequate frame rate of display. This is also consistent with the decrease in the depth of the RMIQ associated with more component frames (larger value of N) for spatial compound imaging. Therefore, the relationships between image depth, frame rate, the number of component frames in a spatial compound image, the size and depth of the RMIQ, and image quality can be exploited to optimize overall performance. Table 1 below shows how these tradeoffs can advantageously be made for different depths, while always maintaining a compound frame rate of 10 Hz or greater.

TABLE 1

| Image display depth, cm | # of frames in compound image | Acquisition frame rate, Hz | Compound display rate, Hz | Max. steering angle, degrees | Depth of RMIQ, cm |
|---|---|---|---|---|---|
| 2 | 7 | 100 | 14 | 45 | 1.3 |
| 4 | 5 | 50 | 10 | 30 | 2.3 |
| 6 | 3 | 37.5 | 12.5 | 15 | 4.0 |
| 8 | 2 | 25 | 12.5 | 9 | 8.0 |

Thus it is seen that as the image display depth increases, the system controller 18 responds by decreasing the number of frames which are acquired and compounded to form the displayed compound image. When the user selects a greater display depth for the scanhead 10, the ultrasound system responds by decreasing the number of frames of the compounded display. As the acquisition frame rate declines the number of frames compounded is also decreased. If the user reduces the frame rate as by increasing the number of lines of an image, for example, the ultrasound system will respond by decreasing the number of compounded frames in a displayed image. When the look directions of the acquired image frames is varied by steering the transmit beams in a number of different look directions the angle of the sides of the trapezoidal-shaped image decreases with increases in the number of images which are compounded. These adaptive changes in the number of frames being compounded maintain the display rate of the compound image at more than ten frames per second, or some other rate which is acceptable for the particular clinical application being performed.

As the number of frames compounded in the displayed compound image decreases, the depth of the region of greatest compounding increases, but is comprised of fewer compounded image frames. In accordance with another aspect of the present invention, as the image depth is decreased, the maximum steering angle of the steered transmit beams also increases. A comparison of FIGS. 3a–3c illustrates how a greater maximum steering angle will more effectively cover a shallow imaging depth, whereas a lesser maximum steering angle is more effective for greater imaging depths.

Thus it is seen that as the image depth is increased the number of look directions compounded in the compound image is decreased, as is the maximum steering angle. The number of look directions is also decreased when the number of lines or line density of the image is increased; when the number of transmit focal zones is increased; when the amount of deadtime per PRI is increased; when the number of transmissions per image line is increased (e.g., for synthetic aperture, pulse inversion harmonic imaging), when the number of simultaneous modes is increased (e.g., spectral Doppler together with 2D imaging), the size of the region of interest is increased (e.g., image zoom is decreased or turned off), the clinical application (e.g., changing from abdominal or peripheral vascular imaging to cardiac imaging), or changing from target to survey mode. When the number of lines which are simultaneously acquired is increased by increasing multiline acquisition, the number of look directions can be increased. It will be apparent to one skilled in the art that other changes in imaging parameters by the user, or various changes in a combination of the above parameters, should also be responded to by a change in the number of look directions which are compounded.

What is claimed is:

1. An ultrasonic diagnostic imaging system, operable in response to the setting of a plurality of operating parameters, comprising:

an array transducer which is operated to acquire echoes from a target at a plurality of different look directions; and a compound image processor, responsive to changes of one or more operating parameters, which compounds echo information of different look directions to form a spatially compounded image, wherein the number of different look directions which are combined to form a compounded image is variable in response to changes of said one or more operating parameters.

2. The ultrasonic diagnostic imaging system of claim 1, wherein one of said one or more operating parameters is image depth.

3. The ultrasonic diagnostic imaging system of claim 1, wherein one of said one or more operating parameters.

4. The ultrasonic diagnostic imaging system of claim 1, wherein one of said one or more operating parameters is the density of lines in an image.

5. The ultrasonic diagnostic imaging system of claim 1, wherein one of said one or more operating parameters is the number of transmit focal zones.

6. The ultrasonic diagnostic imaging system of claim 1, wherein one of said one or more operating parameters is the amount of deadtime per pulse repetition interval.

7. The ultrasonic diagnostic imaging system of claim 1, wherein one of said one or more operating parameters is the number of lines acquired per transmission.

8. The ultrasonic diagnostic imaging system of claim 1, wherein one of said one or more operating parameters is the number of transmissions per image line.

9. The ultrasonic diagnostic imaging system of claim 8, wherein said array transducer transmits multiple times per image line during at least one of synthetic aperture operation and pulse inversion harmonic imaging operation.

10. The ultrasonic diagnostic imaging system of claim 8, wherein said array transducer produces multiple image lines in response to one pulse transmission.

11. The ultrasonic diagnostic imaging system of claim 1, wherein one of said one or more operating parameters is the number of simultaneous imaging modes.

12. The ultrasonic diagnostic imaging system of claim 1, wherein one of said one or more operating parameters is the size of an image region of interest.

13. The ultrasonic diagnostic imaging system of claim 12, wherein the size of a region of interest changes in response to changes in image zoom.

14. The ultrasonic diagnostic imaging system of claim 1, wherein one of said one or more operating parameters is clinical application.

15. The ultrasonic diagnostic imaging system of claim 1, wherein one of said one or more operating parameters is the selection of survey or target mode of operation.

16. The ultrasonic diagnostic imaging system of claim 2, wherein the maximum steering angle of the different look directions is varied in response to a change in image depth.

17. The ultrasonic diagnostic imaging system of claim 1, wherein said array transducer is operated to acquire images at one of a plurality of different acquisition frame rates,
wherein the number of echo signals from different look directions which are combined to form a compounded image by said compound image processor is related to the acquisition frame rate at which said array transducer is operated.

18. The ultrasonic diagnostic imaging system of claim 1, wherein said compound image processor forms spatially compounded images for real time display while said array transducer is operated to acquire target echoes at a plurality of look directions.

19. A method of forming a spatially compounded ultrasonic image with an ultrasonic imaging system having a plurality of different variable operating parameters comprising the steps of:

acquiring a plurality of ultrasonic echoes from a target from a plurality of different look directions; and compounding a number of said ultrasonic echoes which is chosen in relation to the setting of said variable operating parameter.

20. The method of claim 19, wherein one of said operating parameters is image depth.

21. The method of claim 20, wherein the maximum steering angle of the different look directions is varied in response to a change in image depth.

22. The method of claim 19, wherein one of said operating parameters is the number of lines in an image.

23. The method of claim 19, wherein one of said operating parameters is the density of lines in an image.

24. The method of claim 19, wherein one of said operating parameters is the number of transmit focal zones.

25. The method of claim 19, wherein one of said operating parameters is the amount of deadtime per pulse repetition interval.

26. The method of claim 19, wherein one of said operating parameters is the number of lines acquired per transmission.

27. The method of claim 19, wherein one of said operating parameters is the number of transmissions per image line.

28. The method of claim 19, wherein one of said operating parameters is the number of simultaneous imaging modes.

29. The method of claim 19, wherein one of said operating parameters is the size of an image region of interest.

30. The method of claim 19, wherein one of said operating parameters is clinical application.

31. The method of claim 19, wherein one of said operating parameters is the selection of survey or target mode of operation.

32. A method of forming a spatially compounded ultrasonic image comprising the steps of:

acquiring a plurality of ultrasonic images of a region of the body from different look directions; and compounding a number of said ultrasonic images which is chosen in relation to an acceptable display frame rate of said spatially compounded ultrasonic images.

33. A method of forming a spatially compounded ultrasonic image comprising the steps of:

acquiring a plurality of ultrasonic images of a region of the body which exhibit different look directions by means of an array transducer;

compounding a number of said ultrasonic images to form a spatially compounded ultrasonic image; and displaying said spatially compounded ultrasonic image at a display frame rate, wherein the number of images which are compounded to form said spatially compounded image is varied in response to the setting of one or more of the parameters of: image display depth, frame acquisition rate, number of scanlines, image line density, number of transmit focal zones, amount of deadtime per PRI, number of transmissions per image line, depth of region of greatest compounding, clinical application, number of simultaneous modes, size of region of interest, and mode of operation.

34. The method of claim 33, wherein said mode of operation comprises survey or target mode.

* * * * *